SERGE V. DRABOWITCH
INVENTOR

Karl F. Ross
AGENT

SERGE V. DRABOWITCH
INVENTOR

Karl F. Ross
AGENT

United States Patent Office 3,273,149
Patented Sept. 13, 1966

3,273,149
RADAR SYSTEMS USING SECOND- AND HIGHER-ORDER RESPONSE SIGNALS
Serge V. Drabowitch, Paris, France, assignor to Compagnie Francaise Thomson-Houston, Paris, France, a corporation of France
Filed May 14, 1964, Ser. No. 367,332
Claims priority, application France, May 17, 1963, 935,219, Patent 1,366,828; Apr. 29, 1964, 972,812, Patent 85,770
23 Claims. (Cl. 343—16)

This invention relates to a new principle for radar work, by means of which it will be possible to derive more detailed information concerning a radar target, and investigate the fine structure of a compound or multiple target, in a manner impossible with present-day radar systems.

It should be understood at the outset that while the present specification and the claims refer to radar systems, beams and targets, the term radar should be interpreted broadly as applying both to cases where the target is a passive reflector, i.e. radar systems proper, and to cases where the target includes an active transmitter, i.e. transponder systems and the like; the term "response beam," used in the appended claims, is therefore intended to encompass both a passively reflected and an actively transmitted incoming beam.

The principle underlying the invention can mostly briefly be described as residing in the employment of the heretofore unused higher-order terms present in the irradiation function of a radar target with a beam of radio energy in order to derive information concerning the target which would not otherwise be available.

To grasp this formulation of the inventive principle it should be understood that the irradiation function of a target with a beam from a radar emitter, i.e. the law of variation of the reflected signal amplitude as a function of the angular displacement from the mean direction of the target, can be characterized by its successive moments of irradiation of the order zero, order one, order two and so on. It can be shown that these moments are the coefficients of the infinite Taylor series of the field received on the antenna aperture; and this is the meaning to be ascribed to this last expression (and similar expressions) where used in the present specification and claims.

The invention is based on the recognition that prior-art radar systems have been limited, at most, to a determination of the first-order term or irradiation moment, and that a knowledge of further terms or moments of orders higher than one should afford greatly improved resolution and more detailed information concerning the fine structure of the target, especially in the case of compound or multiple targets. If a radar system could give all the terms of the series, or irradiation moments, a complete picture of the target in minutest detail could be had; this goal is of course unattainable; but even the first few terms of the series, if they could be made available, would give valuable information concerning the details of the target not ascertainable by means of conventional radar systems. It is an object of this invention to provide antenna arrays and associated radar apparatus that will make possible this result.

More specifically, and as will be shown mathematically further on, the order-one irradiation moment can be considered as describing the direction of the target. This is all the information that conventional, e.g. monopulse, radar systems can provide because conventional radar antenna arrays are limited to irradiation patterns which include terms of orders zero and one only. The order-two irradiation moment can be broadly considered as describing the apparent angular area of the target and the separation between the constituent elements of a multiple or compound target (such as a group of two or more aircraft), so that if the order-two term is made available direct information is obtained concerning target area and separation between closely spaced reflective parts of a composite target, and the resolution of the radar system will thus be greatly increased. It is a specific object of this invention to provide antenna arrays, and associated radar apparatus, which will achieve this result.

Proceeding further in the Taylor series, the order-three term or irradiation moment can be regarded broadly as describing the asymmetry characteristics of the target; for example the relative sizes of the constituent elements of the afore-mentioned multiple target such as the individual airplanes composing it. The present invention contemplates the determination of the order-three as well as, conceivably, even higher-order terms or irradiation moments.

Figure 1A:
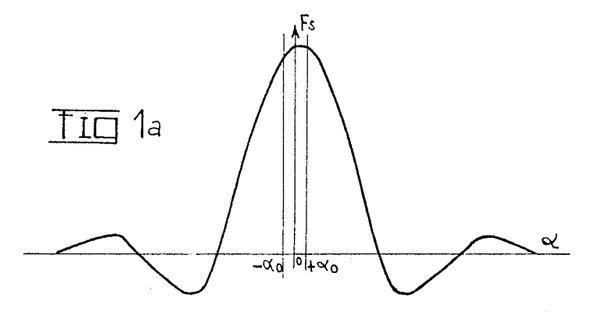
FIGS. 1a, 1b, 1c, already referred to above, are graphs showing echo-signal amplitude (more precisely the square root of signal gain) as a function of angular displacement off the mean direction of the target.
Figure 1B:
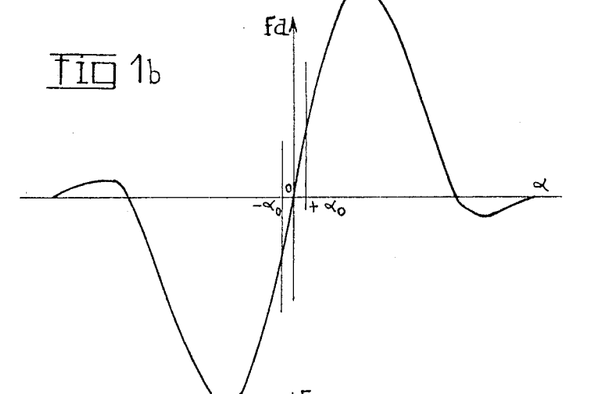
Figure 1C:
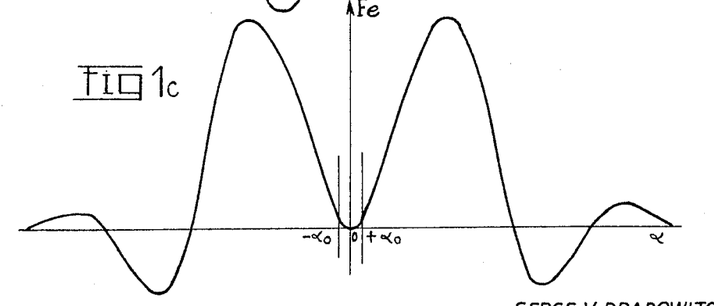

The manner in which the invention obtains the higher-order moments of the irradiation function of a radar target will be described in detail later, it being sufficient at this point to indicate that the method of the invention involves so disposing and interconnecting a plurality of (three or more) radiators of an antenna array as to derive therefrom at least three different types of directional patterns or diagrams, e.g. as illustrated by the graphs of FIGS. 1a, 1b, 1c of the accompanying drawing representing:

A first diagram (FIG. 1a) in which echo-signal amplitude is a maximum for zero displacement off the mean target direction or beam axis and remains substantially constant (or actually falls off gradually as shown) for small angular displacements to either side from the zero direction;

A second diagram (FIG. 1b) in which echo-signal amplitude is zero for zero angular displacement and follows a linear law for small angles to either side therefrom; and A third diagram (FIG. 1c) in which the echo-signal amplitude is zero for zero angular displacement and follows substantially a square law (parabolic function) for small angles to either side from zero.

The first type of echo signal $Fs$ (FIG. 1a) is shown to follow a zero-order law of variation around the origin and constitutes a zero-order moment or component of the total irradiation function, as will be more clearly understood later. The second type of signal $Fd$ (FIG. 1b) similarly constitutes a first-order moment of the irradiation function, and the third type of echo signal $Fe$ (FIG. 1c) constitutes a second-term moment of the irradiation function.

According to the invention, the three echo signals thus obtained are then exploited in suitable electronic apparatus so as to derive from the order-one signal information specifying the direction of the target and from the order-two signal information specifying the apparent area of the target and separation between constituent elements of the target. For this purpose, according to a preferred embodiment of the invention, each of the order-one and order-two signals (and higher-order signals if used) are demodulated in a coherent demodulator using a constant-amplitude signal, which preferably is the order-zero signal.

It will be understood that in cases where it is desired, in a radar system according to the invention, to use echo signals of order or orders higher than the second, such signals can be obtained through the use of antenna arrays providing additional directional patterns of suitable shape. Thus, for a third-order signal, there would be used a directional pattern in which the echo signal amplitude is zero at zero off-beam displacement and follows approximately a cubical parabolic law for small angular displacements around the origin, and so on for any higher-order signals desired.

Thus, the invention in a basic one of its aspects is directed to a radar system comprising means for irradiating a target with a radar beam, means for receiving a reflected beam, means for deriving from the reflected beam a series of at least three echo signals whose variations as a function of angular displacement to either side from mean target direction follow a constant law, a linear law and at least one law of higher order respectively, means for exploiting said linear-law signal to determine target direction and means for exploiting said higher-order signal to determine information concerning the fine structure of the target.

This invention will now be described in greater detail with reference to the accompanying drawing wherein:

FIG. 3b shows a set of curves constituting primitive radiation patterns obtained with the antenna array of FIG. 3a;

It will be understood that the radiation patterns or diagrams referred to in the present disclosure and including those shown in FIGS. 1a, 1b, 1c, 3b and 3c refer to each scanning plane of an antenna system.

The present invention, in its basic aspect relating to an antenna system, can be conceived of as providing an antenna system or array possessing a plurality of, i.e. at least three, degrees of freedom in each scanning plane so as to be capable of yielding at least three mutually independent radiation patterns or diagrams in each scanning plane. It is this plurality of independent radiation patterns which, as explained above, makes possible a more detailed analysis of the field structure over the aperture of the radiant array, and hence in turn a more detailed analysis of the fine structure of the target. It should be realized in this connection that present-day radar systems permit a correct localization of a simple, i.e. point-type, target with a high degree of accuracy which in fact is limited only by the manufacturing tolerances used in the antenna components and the presence of noise sources adjacent the system in operation. However, in actual fact a target never constitutes a true geometric point, but must always to some extent possess an apparent diameter, shape, and fine structure as determined by the configuration of various selective portions of the target. Thus the wings, fuselage and engines of an airplane do not reflect the radar signals in exactly the same way. With greater reason a composite target such as a flight of airplanes grouped so as to be situated at a given instant within a common radar beam cannot easily and unmistakably be identified as such with present-day systems, at any rate with sufficient definition to enable an accurate measurement of the separation between, and a reliable count of the individual planes. The invention, through the use of antenna arrays capable of providing higher-order irradiation moments as explained herein, makes it possible to resolve a complex radar target into its component elements and to gain detailed information concerning its fine structure.

Returning to FIGS. 1a, 1b and 1c, earlier described, it is to be noted that the upper two diagrams, i.e. the zero-order pattern of FIG. 1a and the first-order pattern of FIG. 1b, are both obtainable with conventional radar tracking systems of the so-called "monopulse" type. Monopulse radar systems are well known in the art and will not be described in detail herein, since an adequate disclosure can be found in various standard works such as Rhodes' "Introduction to Monopulse" (McGraw-Hill Company 1959). It is sufficient for the purposes of this specification to state that monopulse systems utilize two-degrees-of-freedom antenna arrays which yield two independent types of radiation patterns, a so-called "sum" pattern similar in shape to the curve shown in FIG. 1a, and a so-called "difference" pattern similar to the curve of FIG. 1b. Within a small region $(-\alpha, +\alpha)$ surrounding the origin 0 of angular deflections, the echo-signal amplitude $Fs$ of the monopulse sum pattern shown in FIG. 1a can be considered as a constant both in amplitude and in phase and hence fulfills the specifications for the "zero-order" signal required according to the invention. Similarly, within a small region surrounding the origin, the echo-signal amplitude $Fd$ of the monopulse difference pattern shown in FIG. 1b can be assimilated with a straight line having a 180° change of phase from one side to the other of the origin, and hence fulfills the requirements for the "first-order" signal utilized according to the invention.

While monopulse systems make it possible to obtain radiation patterns of the types shown in FIGS. 1a and 1b, it is emphasized that this is as far as the prior art has gone. No conventional antenna array, so far as I am aware, is capable per se of providing, in addition, a radiation pattern similar to the one shown in FIG. 1c and required as the "second-order" signal in a system according to the invention. For deriving a radiation pattern of the character shown in FIG. 1c, it becomes necessary to use an antenna array possessing three degrees of freedom as will now be described with reference to FIGS. 3a, 3b, 3c.

Figure 3A:
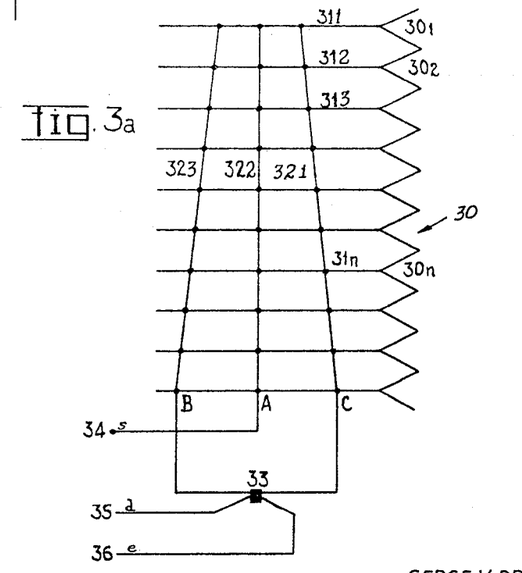
FIG. 3a is a schematic illusrtation of an antenna array according to a first embodiment of the present invention.

One embodiment of a three-degree-of-freedom antenna array according to the invention is schematically illustrated in FIG. 3a as comprising a multi-beam array of aligned radiators, e.g. horns, 301, 302, ... 30n ... constituting together a radiant aperture 30. The individual horn radiators of the array 30 are fed from parallel waveguides 311, 312 ... 31n which in turn are excited by way of suitable directional couplers from a set of at least three transversely arranged parallel guides 321, 322, 323, appropriately decoupled to avoid energy losses among one another. The directional couplers positioned at the intersections of the longitudinal and transverse sets of guides are so arranged that all the horn radiators of the array 30 are excited with equal amplitudes.

Figure 3B:
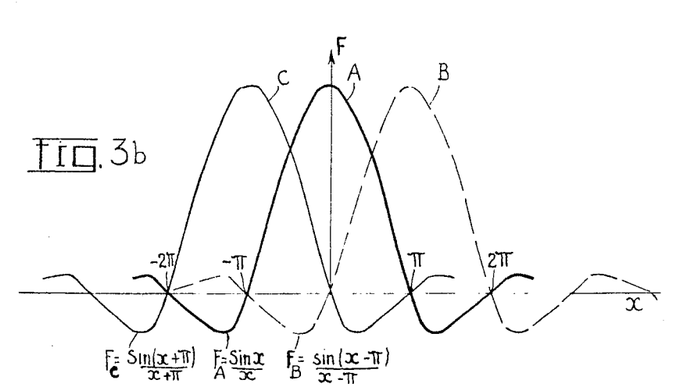

As will be shown mathematically at a later point, the radiant energy transmitted from and/or received by the array 30 as fed from or to the respective transverse guides 321, 322 and 323 can be made to follow three adjacent, orthogonally related, directional patterns of the types shown at C, A and B, respectively, in FIG. 3b. It is immediately seen that the central pattern or diagram A is identical with the sum or zero-order signal pattern of FIG. 1a. Accordingly, this signal $s$ as present on the middle guide 322 is fed to a terminal 34 which thus provides the zero-order output channel of the antenna system.

The signals from the end guides 321 and 323, which follow the patterns B and C (FIG. 3b), are applied to the respective inputs of a magic-tee circuit 33 so as to be linearly combined therein in addition and subtraction, respectively. As will be evident from the chart of FIG. 3c, subtraction of the signals B and C results in the signal pattern designed $(B-C)$, which is identical with the first-order signal pattern shown in FIG. 1b (or monopulse "difference" signal pattern). Accordingly, the signal $d$ tapped from the difference output of the magic-T circuit 33 is applied to a terminal 35 which provides the first-order-signal output channel of the antenna array of the invention.

Figure 3C:
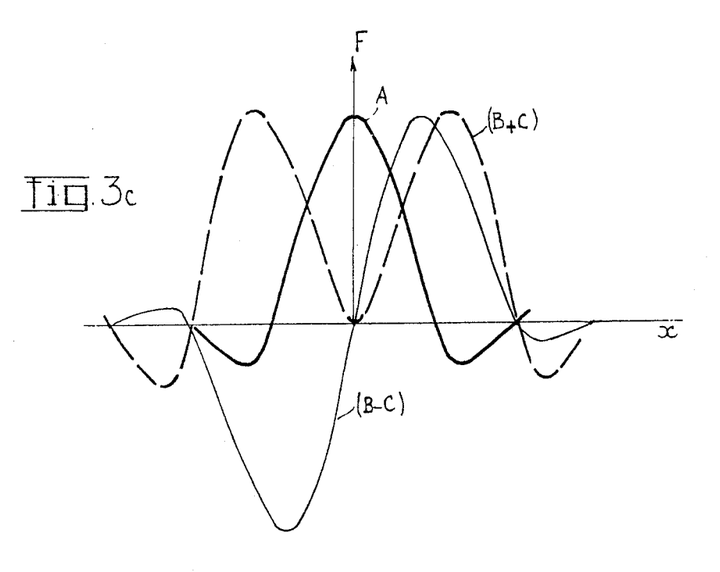
FIG. 3c shows a set of curves constituting radiation patterns derived from the foregoing ones, and providing the order-zero, order-one and order-two signals required in carrying out the invention.

The addition of signals B and C is similarly seen to result in a signal pattern as designated (B+C) in FIG. 3c, which is clearly identical with the second-order signal pattern shown in FIG. 1c as required in a system according to this invention. Accordingly the signal e taken from the sum output of the magic-T circuit 33 is applied to an output terminal 36 which provides the second-order output channel of the antenna system disclosed.

It has thus been summarily shown—and a stricter mathematical proof will follow later—that the antenna array shown in FIG. 3a is capable of developing the three minimum types of signals, i.e., orders zero, one, and two, which are required in carrying out the invention. How these three signals can be exploited in accordance with the invention for deriving, in addition to the usual information on target direction, additional information concerning the apparent area and structure of the target, not ascertainable in the absence of these three signals pursuant to the invention, will now be described with reference to FIG. 4.

Figure 4:
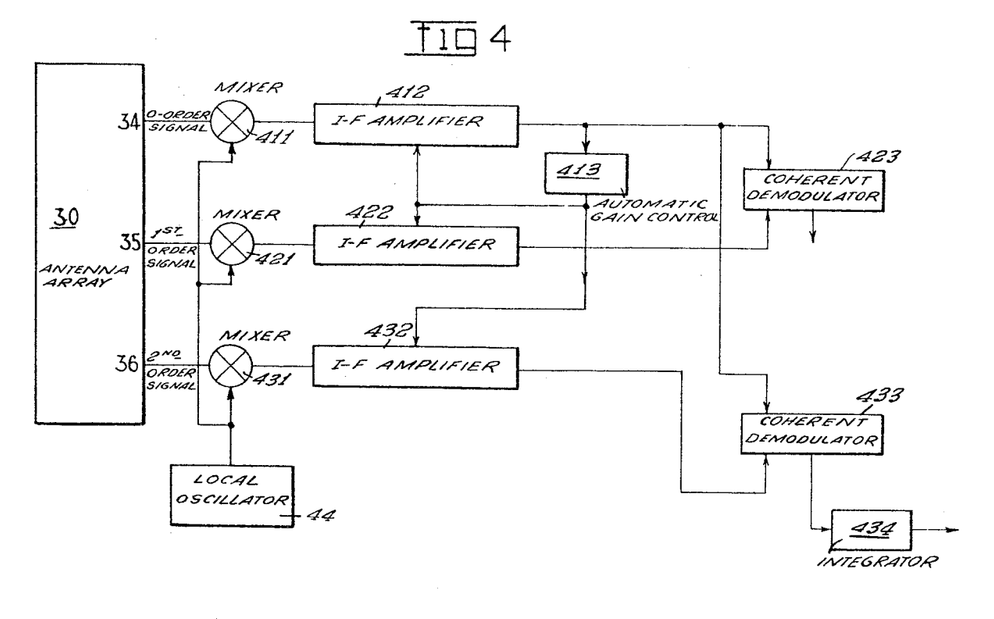
FIG. 4 is a block diagram of electronic apparatus according to the invention for exploiting the novel radar signals hereof.

In the block diagram of FIG. 4, block 30 designates a three-degree-of-freedom antenna system which may be similar to the one schematically shown in FIG. 3a and just described, with its three outputs 34, 35, 36, which respectively supply the zero-, first-, and second-order signals. These three signals are respectively applied to first inputs of three mixers 411, 421, 431 whose second inputs are supplied in parallel with the output of a local heterodyne oscillator 44 to provide respective intermediate-frequency signals at the outputs of the mixers. These last signals are applied to the inputs of respective I.-F. amplifiers or receivers 412, 422, 432.

The output of the I.-F. amplifier 412 in the zero-order channel is applied to the input of an automatic gain-control circuit 413, whose output is fed back negatively to all three I.-F. amplifiers 412, 422, 432 as shown. The relative polarity of the feedback signal applied from the AGC circuit 413 to each of the three I.-F. amplifiers or receivers 412, 422, 432 is so predetermined that the gain through the amplifier 412 in the zero-order channel is at all times regulated to provide a substantially constant amplitude at the output of the zero-order-channel, and that the gains through the first-order channel amplifier 422 and the second-order-channel amplifier 432 are regulated to provide amplitudes at the outputs of said respective two channels which are normalized with reference to the zero-order-channel output. Thus, the outputs from the first- and second-order-channel amplifiers 422 and 432 are made substantially independent from any variations in the power picked up by the antenna system 30.

The zero- and first-order-channel outputs from amplifiers 412 and 422 are applied to the inputs of a first coherent demodulator 423. Concurrently, the zero- and second-order-channel outputs from amplifiers 412 and 432 are applied to the inputs of a second coherent demodulator 433.

The output signal from demodulator 423 is a directional signal and provides the indispensable information as to the direction of the center of gravity (in terms of radiation) of the target, with the high accuracy provided by a conventional monopulse system.

The output signal from demodulator 433 conveys information concerning the apparent angular area of the target, such as the angular separation between a plurality of closely-grouped aircraft, this being a type of information signal not developed by any radar system of the prior art and considered extremely valuable in radar work.

Preferably, as shown, an integrator or smoothing network 434 having and adjustable time constant is provided in the output of demodulator 433 to delay the separation signal prior to use, and thereby reduce disturbances due to thermal noise and the like, and increase the accuracy of the output information. A similar integrator, not shown, may if desired be provided at the output from demodulator 423.

Figure 5:
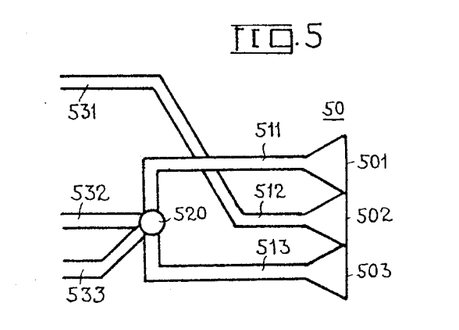
FIG. 5 is a schematic view of a three-antenna array according to another embodiment of the invention.

FIG. 5 illustrates schematically a different embodiment of a three-degree-of-freedom antenna array which can be used according to the invention instead of the array shown in FIG. 3a. In this case there is provided an array 50 of three horn radiators 501, 502, 503 juxtaposed in a common plane, and associated with the feeder waveguides 511, 512, 513 respectively. A zero-order-channel output 531 is derived from guide 512 by exciting all three radiators 501, 502, 503 with signals of common phase and symmetrically related amplitudes with reference to the central radiator. A first-order-channel output 532 is derived at one output of a magic-T device 520 having its opposite inputs supplied through the guides 511 and 513 connected with the end radiators 501 and 503, so as to provide signals of common amplitude and opposite phase. And a second-order-channel output 533 is derived from the other output of the magic-T device 520 so as to provide signals of common amplitude and similar phase.

In order that the second-order signal pattern at 532 shall have a zero value at the origin, as is required, it is necessary that the spacing between phase center of the end radiators 501 and 503 shall be appropriately adjusted with due regard for the focal and diameter characteristics of the focalizing system used.

It will be understood that the antenna array of the invention shown in FIG. 5 (like that of FIG. 3a) relates to a single phase of sweep and that normally a further, similar array would be provided for the orthogonal plane. The embodiment shown in FIG. 6 and now to be described is advantageous in that it provides a complete two-dimensional antenna system with a reduction in equipment.

Figure 6:
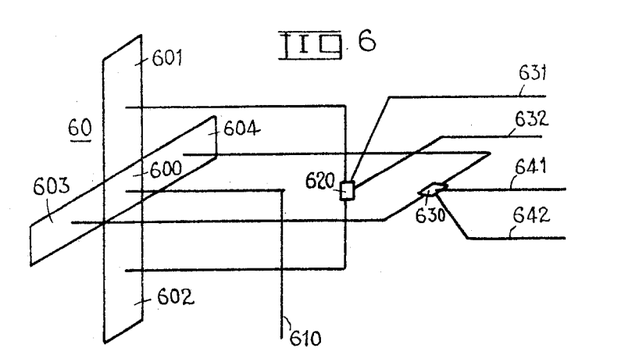
FIG. 6 is a schematic perspective view of an antenna array according to a further embodiment.

This antenna array 60 includes five primary radiators disposed in a cross pattern in a vertical plane which is the focal plane of a focusing system (reflectors or lenses), including a central radiator 600, upper and lower radiators 601 and 602 and lateral radiators 603 and 604. A zero-order output signal is derived at output 610 which is excited from all five radiators with signals of common phase and symmetrical amplitudes on opposite sides from the central radiator 600. First- and second-order elevational signals are derived at outputs 631 and 632 connected to the subtractive and additive outputs, respectively, of a first magic-T circuit 620 whose opposite inputs are excited from the upper and lower radiators 601 and 602. Similarly, first-and-second order azimuth signals are derived at outputs 641 and 642 connected to the subtractive and additive outputs, respectively, of a second magic-T circuit 630 whose opposite inputs are excited from the lateral radiators 603 and 604. The common zero-output signal at 610 serves to demodulate both the first- and second-order signals in both the elevation and azimuth channels.

In this embodiment as in the one of FIG. 5, the spacing between phase centers of the side and central radiators should be suitably selected with regard to the characteristics of the focalizing system used to ensure that the second-order signals effectively have zero amplitude on the beam axis.

It will be understood that the showings in FIGS. 5 and 6 are highly schematic, and that various conventional components, including directional couplers, have been omitted.

The mathematical theory of the invention will now be summarily set forth.

Figure 2:
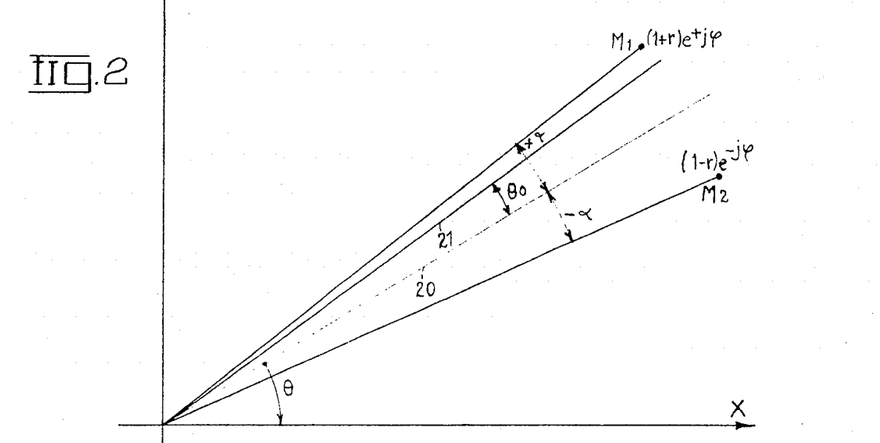
FIG. 2 is a two-dimensional diagram illustrating the geometry involved in the case of a composite radar target composed of two point elements.

FIG. 2 shows a compound target constituted by two discrete objects $M_1$ and $M_2$ separated by an angle $2\alpha$. The geometric midpoint of the segment joining the two objects situated on a line 20 which forms an angle $\theta$ with the center axis X of the antenna array, not shown, positioned at the origin of coordinates.

The energy reflected from each object $M_1$, $M_2$ is known to have an amplitude proportional to the complex expressions $$W_1 = (1+r)\exp j\phi \quad (1)$$

and $$W_2 = (1-r)\exp -j\phi \quad (2)$$

respectively, where $r=(A_1-A_2)/(A_1+A_2)$, the terms $A_1$ and $A_2$ designating the crest values of the respective amplitudes.

When the zero- and first-order echo signals are combined in a coherent demodulator such as 423 (FIG. 4) as earlier explained, the resulting demodulated output signal $x$ varies as a linear function of both the off-center angle $\theta$ and the separation angle $\alpha$. This output signal $x$ is applied to the conventional radar-antenna-positioning servos which thereupon operate to rotate the antenna array to a new position in which the center axis of the array, originally coinciding with the X-axis, coincides with a direction 21. The direction 21 along which the antenna axis is finally positioned when the servo error signal $x$ is zero and which generally constitutes the direction of target localization is generally displaced somewhat from the true geometric target direction 20 by an angle $\theta_0$ having the absolute value $2r\alpha/(1+r^2)$. The localization direction 21 would only coincide with the true geometric direction 20 for $r=0$, or $A_1=A_2$, that is, in the special instance that the refection factors of both objects $M_1$ and $M_2$ are the same. It will be noted that regardless of the value of $r$, the direction of localization 21 always lies within the angle $2\alpha$ separating the two objects, i.e. $/\theta_0/<\alpha$.

With the antenna positioned to have its center axis coinciding with the direction of localization 21, when the zero- and second-order output signals are now combined in the coherent demodulator 433, the resulting demodulated output signal, $y$, can be expressed as $$y = 2R^2\left(\frac{D}{\lambda}\alpha\right)^2 \quad (3)$$

where R represents the expression $(1-r^2)/(1+r^2)$, D represents the aperture of the radiant array, and $\lambda$ is the wavelength.

The output signal $y$ is seen from Equation 3 to give a measure of the angular separation $2\alpha$ or apparent angular area of the composite target, provided $r$ is known. Equation 3 also shows that whatever the value $r$, the $y$ signal is proportional to the second-order moment of the target-irradiation function, just as the $x$ or directional signal was proportional to the first-order moment.

In geometrical terms, the first-order or directional signal $x$ is assimilable to information specifying the position of the center of gravity of the set of objects comprising the multiple target, while the second-order or separation signal $y$ represents information specifying the moment of inertia of the target components with reference to said center.

It is thus seen that the separation signal $y$ is proportional to the apparent angular area of the target, squared. In the special instance where the target is composed of only two objects, this signal is proportional to the angular separation of said objects squared. It will readily be understood however that the compound target is not necessarily made up of two (or more) discrete point objects, but may comprise a set of passive reflector objects, weighted in proportion to their reflective factors, or a set of active radiant sources weighted in proportion to their radiation intensities, or further it may comprise a continuous, compact or "solid" object.

In all such cases the $y$ or separation signal developed in accordance with the invention will impart information concerning target dimensions and structure which would not otherwise be available. The maximum resolution achievable by the $y$ signal of the invention will now be investigated. It is evident that in the absence of disturbances, the resolution $\alpha_{min}$ of the system would only be limited by the limit of perception of the $y$ signal, i.e. would be virtually infinite. However, thermal noise disturbance imposes a limit on $\alpha_{min}$. The information is more and more greatly perturbed by thermal noise as the angular separation between the target elements diminishes and approaches as a limit the true separating power of the radiant system. This difficulty is largely overcome according to the invention by interposing an integrator or smoothing circuit in the second-order channel, such as the integrator 434 positioned beyond the demodulator 433 in FIG. 4. The integrator smooths out signal fluctuations due to thermal noise.

More precisely, calculation shows that if the second-order output signal is integrated by the device 434 over a time period T including N signal pulses, the new resolution $\alpha_{min}$ of the system is given by the relation $$\alpha_2^{min.} = \frac{1}{2k}\left(\frac{\lambda}{D}\right)^2 \quad (4)$$

where $$k^2 = N\frac{W_s}{W_n}$$

the ratio $W_s/W_n$ being the power ratio between the signals through the zero- and second-order channels.

The resolving power $\alpha_{min}$ of the system of the present invention as given by Equation 4 can be made to be many times greater than the maximum resolving power of a conventional system as given by Rayleigh's classical criterion. The minimum separation angle $\alpha_{min}$ can be several tens of time smaller than the width of the antenna diagram at the 3-decibel level. The improvement can be evaluated as the quotient $(\lambda/D)/\alpha_{min}$.

By way of example, and as an illustration of the improvement obtainable with the invention, assume an antenna array having a radiant aperture $D=5$ meters and a wavelength $\lambda=5$ cm., and further assume that the signal-power ratio through the zero- and first-order channels $W_s/W_n=40$ db. With selection of a time constant for integrator 434 such that $N=1000$, the quotient $$\eta = (\lambda/D)/\alpha_{min} = 80$$

The improvement in resolving power thus obtained increases with increasing antenna-array diameter D.

The above analysis shows that the invention, through the use of an antenna array having provision for at least three degrees of freedom or three independent signal channels of the type specified herein, makes it possible to identify both the geometric center (center of localization) and the apparent angular area of a target having dimensions smaller than the width at mid-power of the main lobe of the beamed energy, in each scanning plane. The resolving power of the improved antenna system corresponding to the smallest identifiable target is thus much greater than that of conventional systems.

As earlier indicated, a number of degrees of freedom or independent signal channels greater than three, e.g. four signal channels with the fourth channel delivering a third-order-moment signal in the form of a cubic parabola around the origin, will in accordance with the invention make available an even greater amount of information on the fine structure of the target.

Mathematical proof will now be given of the fact that an antenna array of the type illustrated in FIG. 3a and earlier described is effectively capable of providing the three independent channel signals having the characteristics specified in accordance with the invention.

The radiation diagram of such an array can be expressed as a curve of the general form $$F = \frac{\sin(x - K\pi)}{(x - K\pi)}$$

where $x = a \sin \theta$ and $a = \pi D/\lambda$. In these expressions $\theta$ is the angular variable, D the aperture of the antenna array, $\lambda$ the wavelength and K a coefficient depending on the particular one of the transverse waveguides (321, 322, 323) to be excited. Assuming the transverse guides to be fully decoupled from one another, K takes on integral values and the resulting radiation diagrams are then orthogonally related. Thus, for the three curves C, A, B shown in FIG. 3b, K has the values −1, 0, + 1 respectively so that the three curves have the following equations:

(C) $$F = \frac{\sin(x+\pi)}{(x+\pi)} = -\frac{\sin x}{x+\pi}$$

(A) $$F = \frac{\sin x}{x}$$

(B) $$F = \frac{\sin(x-\pi)}{(x-\pi)} = -\frac{\sin x}{x-\pi}$$

When these curves are subtractively and additively combined in the magic-T circuit 33 as earlier described, the resulting composite curves $(B-C)$ and $(B+C)$ have the equations $(B-C)$
$$F = \frac{-2\pi}{x^2 - \pi^2} + \sin x \approx +\frac{4\pi}{x^2 - \pi^2} J(a) \sin \theta$$

$(B+C)$
$$F = \frac{-2x}{x^2 - \pi^2} \sin x \approx +\frac{4a}{x^2 - \pi^2} J(a) \sin^2 \theta \simeq M\theta^2$$

The above equation for $(B-C)$ clearly shows that the corresponding curve is an odd curve which passes through 0 for $\theta = 0$ and changes in sign to either side of the origin. Hence the $(B-C)$ diagram fulfills the requirements for the first-order signal used according to the invention.

Similarly the equation for $(B+C)$ above shows that the corresponding curve is an even curve which is zero for $\theta = 0$ and has the constant-phase, square parabolic shape around the origin as required for the second-order signal used in the method of the invention.

While the invention has been disclosed above with particular reference to systems utilizing amplitude modulation of the signals it is to be expressly understood that the invention is applicable with equal success to phase modulation systems, as will be immediately apparent to those familiar with the art.

Various other modifications may be conceived within the scope of the invention. Thus the basic layout of the system described is that of a monopulse radar system and this is usually preferred for the reasons indicated at the beginning of the specification, but is not essential. Further, it is contemplated that according to the invention there may be provided, as an attachment for or subassembly in an existing radar installation, means for developing a second-order signal, and possibly higher-order signals, of the kind herein specified, while the zero- and first-order signals would be derived from the main assembly which may be conventional.

In the interests of simplicity of exposition, the specific disclosure and illustrations have been limited to the second-order signal but it is once again emphasized that the invention can advantageously be expanded to derive and exploit signals of higher order, providing the moments of third, fourth, . . . order of the function of target irradiation as this expression has been earlier defined herein. The construction of antenna arrays having the necessary increased number of degrees of freedom, and the electronics for exploiting such high-order signals where used, will be easily understood by those familiar with the art in the light of the explanation found herein.

It is to be understood that all the statements set forth in the specification and claims in regard to antenna systems and related components according to the invention are broadly applicable to receiver and/or transmitter antenna systems, and all such statements should be interpreted with this in mind.

What I claim is:
1. A radar system comprising means for irradiating a target with a radar beam, means for receiving a response beam, means for deriving from the response beam a series of at least three independent signals the variations of which as a function of angular displacement to opposite sides from target direction approximately follow a zero-order law, a first-order law and at least one law of higher order, respectively, means for exploiting said first-order-law signal to determine target direction and means for exploiting said at least one higher-order signal to derive additional information concerning the target.

2. A radar system comprising means for irradiating a target with a radar beam, means for receiving a response beam, means for deriving from the response beam a series of at least three independent signals the variations of which as a function of angular displacement to opposite sides from the beam axis approximately follow a constant law, a linear law and a square parabolic law respectively, means for exploiting said linear-law signal to determine target direction and means for exploiting said square-law signal to determine apparent angular area of the target and separation between elementary constituents of a compound target.

3. A radar system comprising means for irradiating a target with a radar beam, means for receiving a response beam, means for deriving from the response beam a series of at least four independent signals the variations of which as a function of angular displacement to opposite sides from the beam axis follow a constant law, a linear law, a square parabolic law, and a cubic parabolic law respectively, means for exploiting said linear-law signal to determine target direction, means for exploiting said square-law signal to determine apparent angular area of the target and separation between elementary constituents of a compound target, and means for exploiting said cubic-law signal to determine further information concerning the fine structure of the target.

4. The system recited in claim 1, wherein said exploiting means includes means for demodulating each of said first-order and higher-order signals with a regulated signal to provide respective output signals.

5. The system recited in claim 1, wherein said exploiting means includes means for demodulating each of said first-order and higher-order signals with said zero-order signal.

6. The system recited in claim 5, including automatic gain-control means for regulating said zero-order signal.

7. The system recited in claim 1, wherein the exploiting means includes a channel for the constant-law signal, a channel for the linear-law signal and a channel for each higher-order signal, amplifier means in each channel, automatic gain-control means having an input connected to the output of the amplifier means in the constant-law channel and having an output connected in feedback relation with each of said amplifier means so as to maintain the amplified constant-law signal substantially constant and maintain the amplified linear-law and higher-order signals at levels normalized with respect to that of said constant-law signal, first coherent demodulator means having inputs connected to the output of the amplifier means in the constant-law channel and to the output of the amplifier means in the linear-law channel respectively, and further coherent demodulator means having inputs connected to the output of the amplifier means in the constant-law channel and to the output of the amplifier means in each of the higher-order channels respectively, the output of each demodulator means being connected to a related output of the system.

8. The system recited in claim 7, including mixer means in each channel ahead of the input to the associated amplifier means, and means for supplying a local heterodyning oscillation to a second input of each of said mixer means.

9. The system defined in claim 7, including an integrator or smoothing circuit connected to at least said further demodulator means to eliminate noise components from the related output signal.

10. The system defined in claim 2, wherein said constant-law and said linear-law signals are provided by the "sum" and the "difference" signals, respectively, of a monopulse system.

11. The system defined in claim 1, wherein said signal-deriving means includes an antenna array comprising a set of at least three radiators, feeder waveguides connected with the individual radiators so as to provide at least three independent signals having radiation patterns expressible in the form $$\frac{\sin (x + K\pi)}{x + K\pi}$$

where $x$ is a function of angular displacement from the center axis of the array and K is a constant coefficient associated with the signal, and means for combining said independent signals so as to derive therefrom at least three independent further signals the variations of which as a function of angular displacement to opposite sides from the center axis of the array approximately follow a constant law, a linear law and a square law.

12. The system defined in claim 11, further including means for exploiting said linear-law signal to determine target direction and means for exploiting said square-law signal to determine apparent angular area of the target.

13. The system defined in claim 11, wherein the arrangement is such that the radiation patterns are mutually orthogonal and said coefficients are integers.

14. The system defined in claim 11, including at least three transverse waveguides substantially decoupled from one another, directional couplers interconnecting said transverse guides with said feeder guides, and means connecting said combining means with said transverse guides.

15. The system defined in claim 14, wherein said radiation patterns are mutually orthogonal and wherein said three transverse waveguides carry independent signals of the forms $$\frac{\sin (x+\pi)}{x+\pi}, \frac{\sin x}{x}, \frac{\sin (x-\pi)}{x-\pi}$$

respectively, in one lateral transverse guide, a central transverse guide and an opposite lateral transverse guide, said combining means being arranged to derive the constant-law signal from said central transverse guide and said linear-law and square-law signals as linear combinations of the signals from said lateral transverse guides.

16. The system defined in claim 14 wherein said combining means includes a magic-T circuit.

17. The system defined in claim 11, which comprises at least one set of at least three aligned primary radiators including two outer radiators, disposed at the focus of a focusing system for electromagnetic radiation, waveguide means connected to the radiators, and directional coupler means connected with the waveguide means so as to excite in-phase signals of symmetrical amplitude in respect to all three radiators for providing the constant-law signal, excite opposite-phase signals of equal amplitude in respect to only the outer radiators to provide the linear-law signal, and excite in-phase signals of equal amplitude in respect to only the outer radiators to provide the square-law signal.

18. The system defined in claim 11, which comprises two sets of at least three aligned primary radiators including two outer radiators disposed in a cruciform configuration at the focus of a focusing system for electromagnetic radiation having aligned arms thereof lying in respective scanning planes and including a radiator at the center of the cruciform configuration common to both sets of the array, first waveguide means connected to the radiators of one set and first directional coupler means connected with the first waveguide means so as to excite in-phase signals of symmetrical amplitude in respect to all three radiators of said one set for providing a first constant-law signal, excite opposite-phase signals of equal amplitude in respect to only the outer radiators of said one set to provide a first linear-law signal and excite in-phase signals of equal amplitude in respect to only the outer radiators of said one set to provide a first square-law signal; and second waveguide means connected to the radiators of the other set and second directional coupler means connected with the second waveguide means so as to excite in-phase signals of symmetrical amplitude in respect to all three radiators of said second set for providing a second constant-law signal, excite opposite-phase signals of equal amplitude in respect to only the outer radiators of said second set to provide a second linear-law signal and excite in-phase signals of equal amplitude in respect to only the outer radiators of said second set to provide a second square-law signals; means for exploiting said first signals in respect to one of said scanning planes; and means for exploiting said second signals in respect to the other of said scanning planes.

19. A method of radar operation comprising irradiating a target with a radar beam, receiving a response beam, deriving from the response beam at least three independent signals whose variations as a function of angular displacement to opposite sides from target direction approximately follow a zero-order law, a first-order law, and at least one law of higher order, respectively, exploiting said first-order signal to determine target direction and exploiting said at least one higher-order signal to derive additional information on the target.

20. A method of radar operation comprising irradiating a target with a radar beam, receiving a response beam, deriving from the response beam at least three independent signals whose variations as a function of angular displacement to opposite sides from target direction approximately follow a zero-order law, a first-order law, and at least one law of higher order, respectively, exploiting said first-order signal to determine target direction and exploiting said second-order signal to determine apparent angular area of the target and separation between elementary constituents of a compound target.

21. The method defined in claim 19, which comprises the further step of demodulating each of said first- and higher-order signals with a regulated signal to provide respective output signals.

22. The method defined in claim 19, comprising the furtrer steps of regulating said zero-order signal, and demodulating each of said first- and higher-order signals with the regulated zero-order signal to provide respective output signals.

23. The method defined in claim 19, including the further step of integrating said higher-order signal over a predetermined period of time.

References Cited by the Examiner
UNITED STATES PATENTS

| | | | |
|---|---|---|---|
| 2,929,056 | 3/1960 | Page | 343—16.1 |
| 3,107,351 | 10/1963 | Milam | 343—16.1 |

CHESTER L. JUSTUS, *Primary Examiner.*

R. E. KLEIN, R. D. BENNETT, *Assistant Examiners.*